United States Patent [19]
Shichijoh et al.

[11] Patent Number: 5,050,049
[45] Date of Patent: Sep. 17, 1991

[54] AUTOMOBILE HEADLAMP SYSTEM

[75] Inventors: Masanori Shichijoh, Kosai; Shigehito Uchiyama, Shizuoka; Yoshio Takeuchi, Ohbu; Hiroyasu Hayakawa, Chiryu, all of Japan

[73] Assignees: Asmo Co. Ltd.; Mitsubishi Jidosha Kogyo Kabushiki Kaisha, both of Tokyo, Japan

[21] Appl. No.: 556,326

[22] Filed: Jul. 23, 1990

[30] Foreign Application Priority Data

Jul. 25, 1989 [JP] Japan .................. 1-192204

[51] Int. Cl.5 .............................. B60Q 1/05
[52] U.S. Cl. .................... 362/65; 362/286; 362/428
[58] Field of Search ............ 362/66, 67, 70, 65, 362/269, 271, 285, 286, 428

[56] References Cited

U.S. PATENT DOCUMENTS

| 4,516,191 | 5/1985 | Moriyama et al. | 362/65 |
| 4,602,319 | 7/1986 | Moriyama et al. | 362/65 |
| 4,622,622 | 11/1986 | Baba | 361/65 |

Primary Examiner—Stephen F. Husar
Attorney, Agent, or Firm—Venable, Baetjer, Howard & Civiletti

[57] ABSTRACT

An automobile headlamp system comprising a retractable headlamp which moves between its retracted position inside the body of an automobile and its protruded position. When the headlamp is in its retracted position, it is covered by a lamp over. When the cover is moved from its closed position to its open position, especially at the beginning of this movement, the rear end of the cover is shifted slightly forwards. Therefore, the lamp cover can be opened without interfering with the body of the automobile if the rear end portion of the cover is not straight but curved to a great extent.

36 Claims, 5 Drawing Sheets

AUTOMOBILE HEADLAMP SYSTEM

BACKGROUND OF THE INVENTION

1. Field of the Invention

The present invention relates to an automobile headlamp system and, more particularly, to improvements in a mechanism for operating a cover for at least one automobile headlamp which can be moved between its retracted position inside the body of the automobile and its protruded position outside the body. The cover can be opened or closed with the movement of the headlamp. When the headlamp is in its retracted position, the cover is in its closed position and forms a part of the outer surface of the body of the automobile.

2. Background Information

In a known cover-operating mechanism for use with a retractable automobile headlamp system as described above, a bracket supporting a headlamp is mounted so that its rear end portion rotates about an axis extending across the vehicle, A lamp cover is securely fixed over the bracket such that the cover and the headlamp rotate about the same axis.

In another known mechanism, a bracket to which a headlamp is mounted is held by a lamp-operating linkage so as to be movable up and down, the linkage having an upper lever and a lower lever. A lamp cover is fixedly mounted to the upper lever and can rotate with the upper lever about the same axis extending across the vehicle.

Referring to FIGS. 4 and 5, there is shown the construction disclosed in Japanese Patent Laid-Open no. 59-192633. This construction includes a headlamp 11, a lamp bracket 12 to which the lamp 11 is mounted, a lamp-operating linkage 18, a stationary bracket 31 fixed to the body of a vehicle, a lamp cover 21, and a rod 51. The linkage 18 consists of an upper lever 13 and a lower lever 14. The lamp bracket 12 is fixed to the stationary bracket 31 by the linkage 18. The cover 21 is pivotally mounted to the body of the vehicle near its rear end 21a. One end of the rod 51 is pivotally mounted to the lower lever 14 of the linkage 18, while the other end is pivotally mounted to the cover 21. As the headlamp 11 is moved upward or downward, the cover 21 is rotated by the rod 51.

In these conventional cover-operating mechanisms of retractable headlamp systems, the lamp cover is pivotally mounted directly to the vehicle body, and the axis of rotation of the cover which runs across the vehicle is fixed.

In an automobile retractable headlamp system it is necessary that the lamp cover does not interfere with the engine hood when the lamp cover is opened or closed and that the hood can be opened and closed without interfering with the lamp cover when the lamp cover is open. Preferably, the parting line between the rear end of the lamp cover and the front end of the engine hood has a good shape. However, limitations are imposed on the shape of the parting line in order that the prior art automobile headlamp system satisfies the aforementioned requirements.

Specifically, if the rear end of the lamp cover is located just above the axis of rotation, then when the lamp cover is opened, the rear end rotates around a hinge and moves backward, thus interfering with the front end of the engine hood. For this reason, the rear end of the engine hood is located above and behind the axis of rotation, for causing the rear end of the hood to fall into the vehicle body when the lamp cover is opened, or the rear end of the hood is located above and ahead of the axis of rotation to elevate the rear end when the lamp cover is opened. Thus, the rear end of the lamp cover is prevented from interfering with the front end of the hood. Therefore, it is impossible to cause the parting line between the rear end and the front end of the engine hood to cross the axis of rotation of the hood. Thus, it is inevitable that the parting line is placed either above and behind or above and ahead of the axis of rotation. The parting line extends straight across the vehicle, which imposes great limitations on the design.

As shown in FIG. 3, if a curved portion 21c having a large radius of curvature is formed around the rear end 21a of the lamp cover 21, then a part of the curved portion 21c is located at 21e just above the axis of rotation 21d of the lamp cover 21. When the lamp cover is opened, this part moves rearward to interfere with the engine hood. Therefore, the axis of rotation 21d must be positioned either behind or in front of the curved portion. If the axis of rotation 21d is located behind the rear end 21a of the lamp cover 21, the cover-operating mechanism itself increases in size and so this arrangement is difficult to achieve. If the axis of rotation 21d is disposed in front of the curved portion 21c, an opening that is large enough to expose the headlamp 11 cannot be formed around the rear end 21b of the lamp cover 21. In this way, this layout is impossible. As a result, it is impossible to form a curved portion of a large radius of curvature around the rear end 21a of the lamp cover 21.

SUMMARY OF THE INVENTION

In view of the foregoing problems, the present invention has been made.

It is an object of the present invention to provide an automobile headlamp system equipped with a cover-operating mechanism that gives a greater degree of freedom to the shape of the parting line between the rear end of the lamp cover and the front end of the engine hood.

In one feature of the invention, when the lamp cover is shifted from its closed position to its open position, the rear end is moved only slightly toward the front of the vehicle. Preferably, this forward movement is made at the beginning of the shift of the cover. Consequently, when the lamp cover is opened, it does not interfere with the vehicle body if the rear end portion of the lamp cover is not straight but curved.

A linkage can be used for moving the lamp cover toward the front of the vehicle. The instantaneous center of the moved linkage is placed above and behind the lamp cover. links which are unlike in length hold the lamp cover. The longer link is disposed ahead of the shorter link. The upper portions of the links are pivoted to the vehicle body, while the lower portions of the links are pivoted to the lamp cover. The front link is inclined with respect to the rear link.

DESCRIPTION OF THE PREFERRED EMBODIMENT

Figure 1:
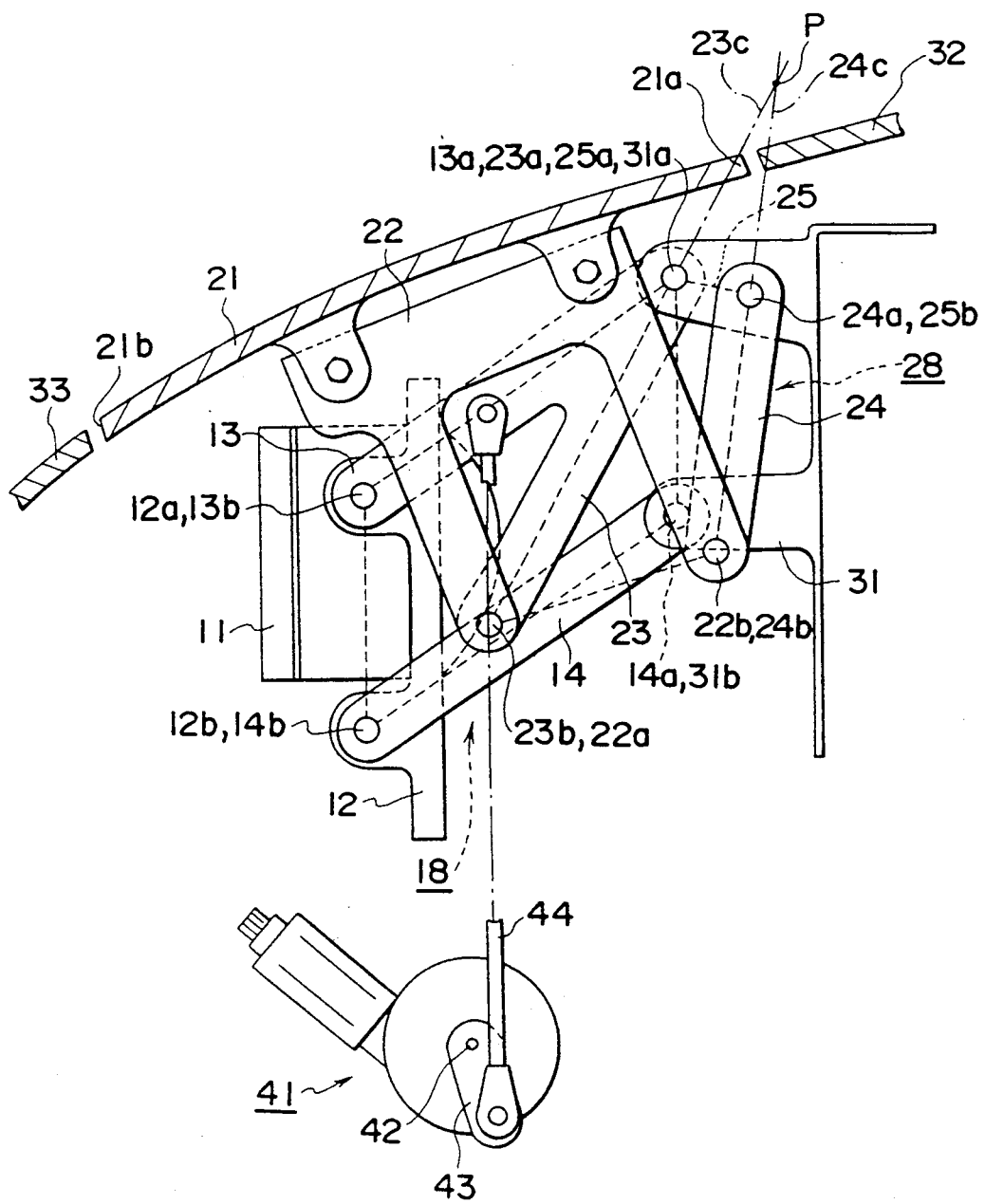
FIG. 1 is a side elevation view in cross section of a headlamp system according to the present invention in which the headlamp is in its retracted position.

Referring to FIG. 1, a headlamp system according to the present invention is shown. This system is installed at the front of an automobile. This figure is a view taken from the left side of the direction of movement. The headlamp 11 is fixedly mounted to a lamp bracket 12. The lamp bracket 12 is supported to the stationary bracket 31 by the upper lever 13 and the lower lever 14 so as to be movable up and down. The stationary bracket 31 is firmly secured to the body of the vehicle. The distance between the fulcrums 13a and 13b of the upper lever 13 is equal to the distance between the fulcrums 14a and 14b of the lower lever 14. The distance between the fulcrums 12a and 12b of the lamp bracket 12 is equal to the fulcrums 31a and 31b of the stationary bracket 31. The lamp bracket 12, the upper lever 13, the lower lever 14, and the stationary bracket 31 form a lamp-operating linkage 18.

A reciprocating driving rod 44 is rotatably connected to the upper lever 13 as well as being rotatably coupled to the crank arm 43. The crank arm 43 is mounted to the rotating shaft 42 of the motor 41.

The lamp cover 21 is screwed or welded to a cover bracket 22. When the headlamp 11 is in the retracted position, the lamp cover 21 is closed forming a continuous outer surface of the automobile body, together with the engine hood 32 and the body 33. The cover bracket 22 is supported by the stationary bracket 31 via the front lever 23 and the rear lever 24. The front lever 23 is formed integrally with the upper lever 13. The distance between the fulcrums 23a and 23b of the front lever 23 is farther apart than the distance between the fulcrums 24a and 24b of the rear lever 24. The distance between the fulcrums 25a and 25b of the stationary link 25 mounted on the stationary bracket 31 is nearer than the distance between the fulcrums 22a and 22b of the cover bracket 22. The cover bracket 22, the front lever 23, the rear lever 24, and the stationary link 25 form a cover-operating linkage 28.

The cover-operating linkage 28 is so designed that when the headlamp 11 is in a retracted position as illustrated, the intersection P of straight lines 23c and 24c is located above and behind the rear end 21a of the lamp cover 21. The straight line 23c connects the fulcrums 23b and 23a of the front lever 23, whereas the straight line 24c connects the fulcrums 24b and 24a of the rear lever 24. The point P is the instantaneous center of the lamp cover 21 and the cover bracket 22 when they are in their closed positions. When the lamp cover 21 begins to open it rotates about the point P.

Figure 2:
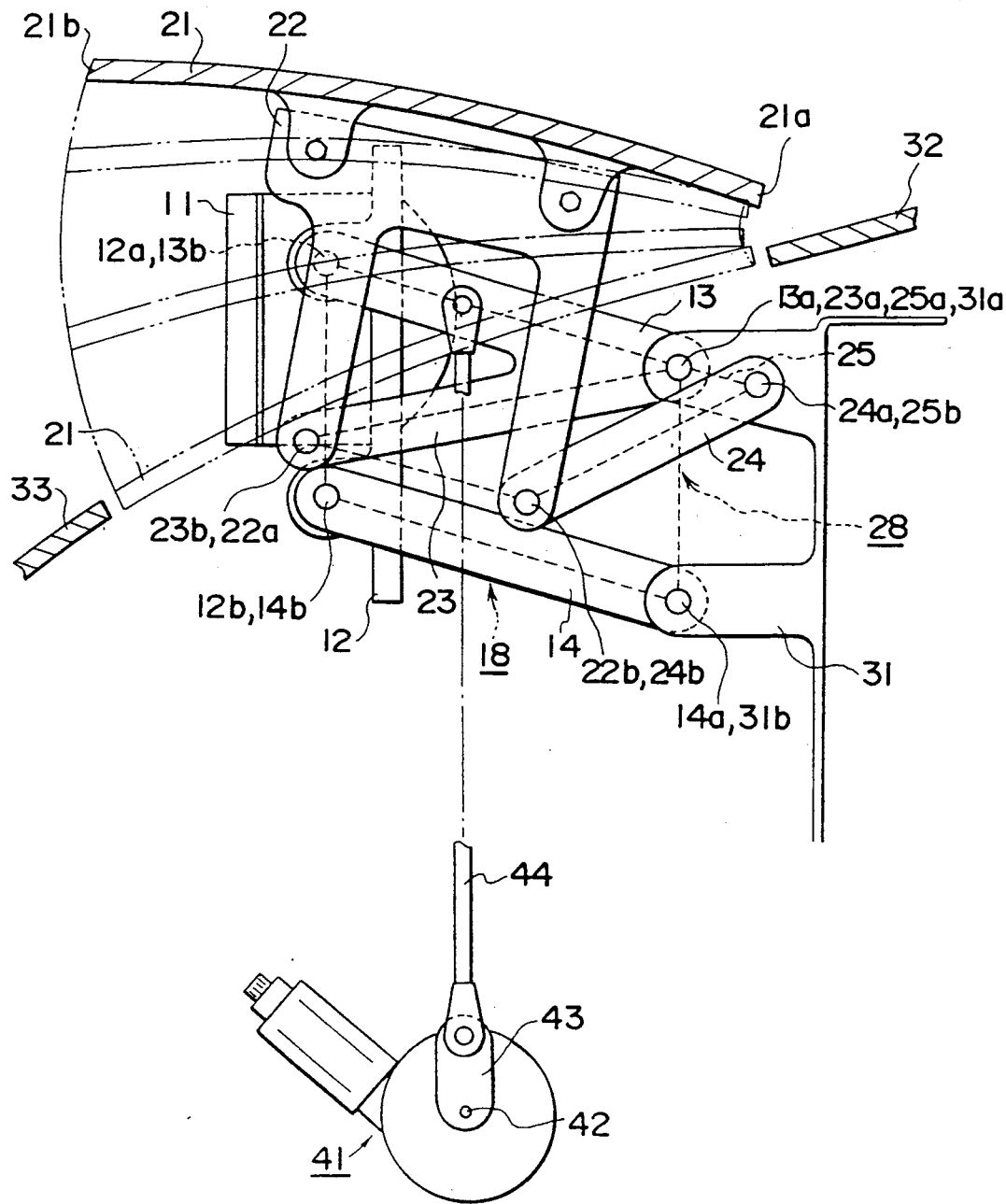
FIG. 2 is a view similar to FIG. 1, but in which the headlamp is in its protruded position and in operation.
Figure 3:
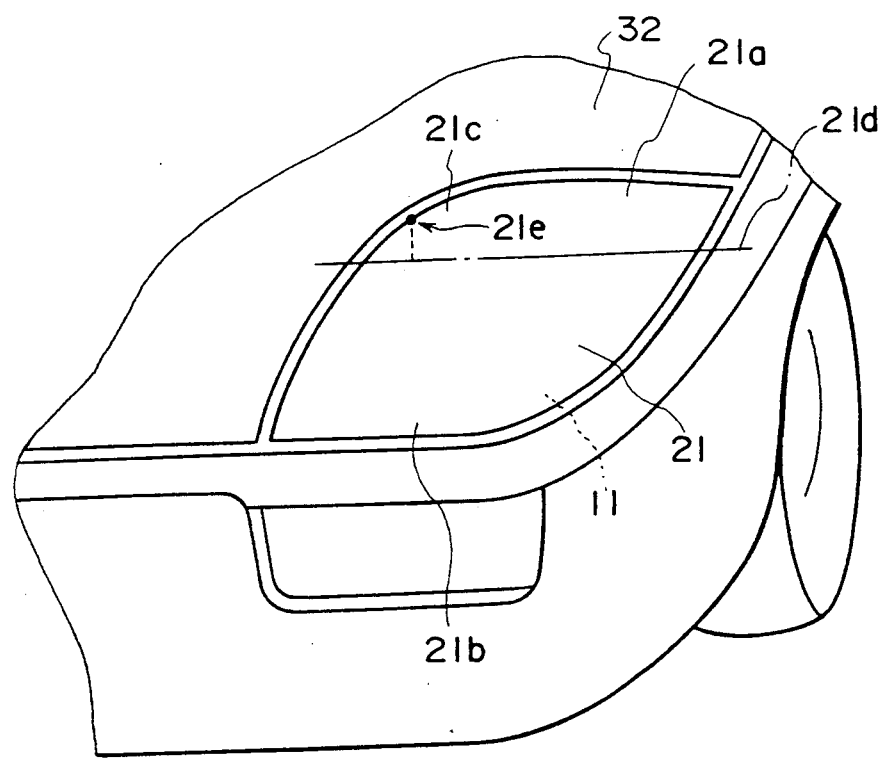
FIG. 3 is a perspective view of a front portion of an automobile, for showing the closed position of the lamp cover shown in FIGS. 1 and 2.
Figure 4:
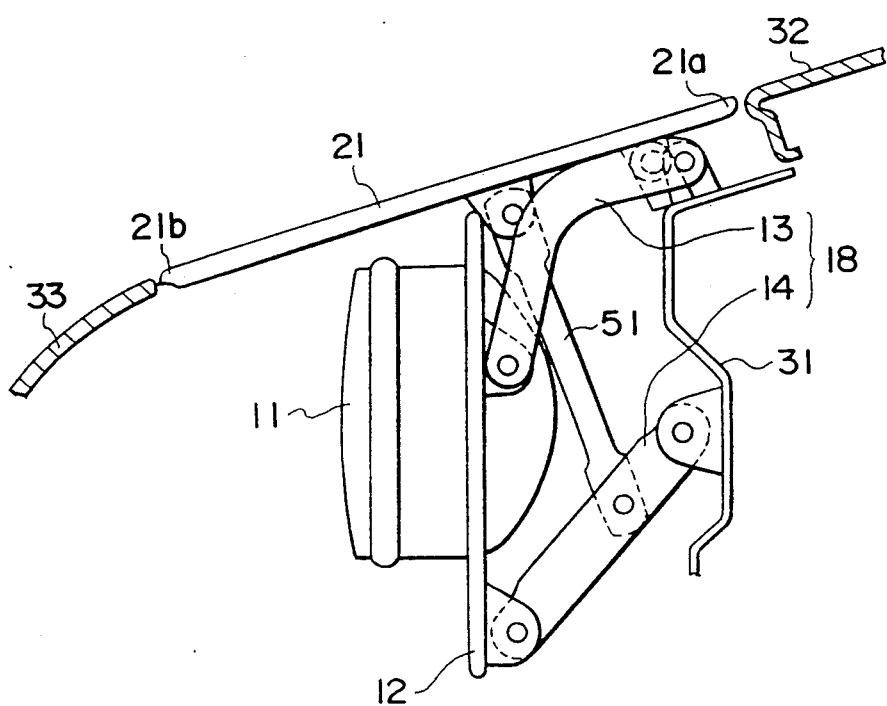
FIG. 4 is a side elevation view in cross section of a conventional headlamp system, and in which the headlamp is in its retracted position.
Figure 5:
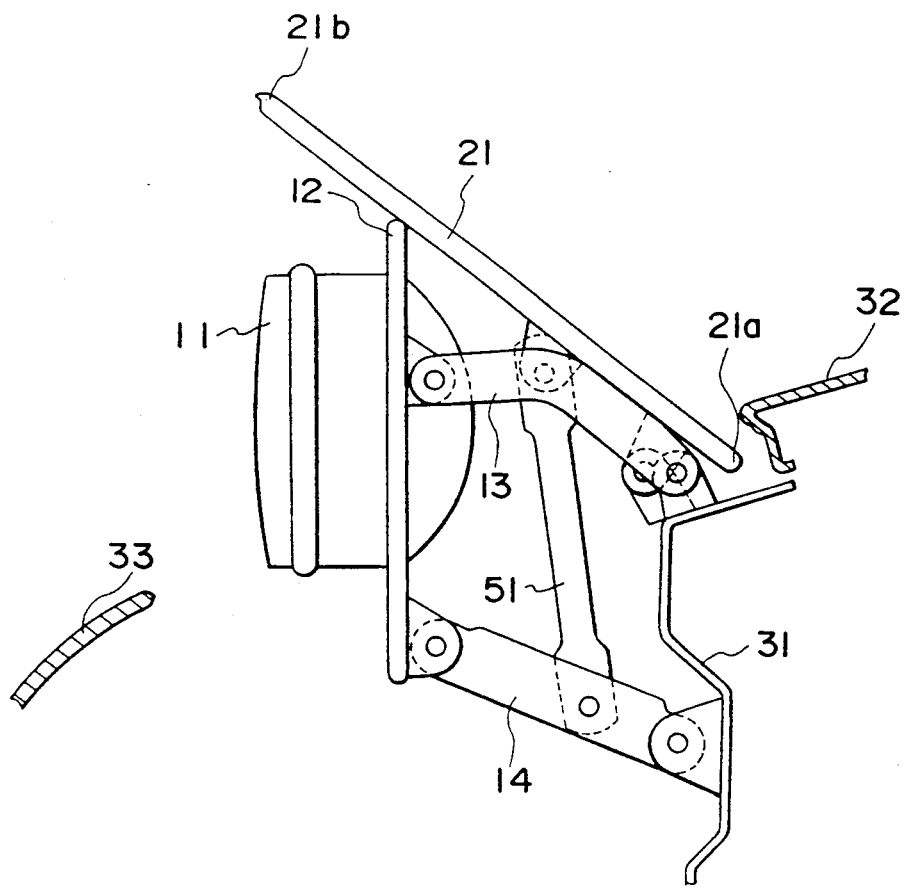
FIG. 5 is a view similar to FIG. 4, but in which the headlamp is in its protruded position and in operation.

The operation of the above described headlamp system is now described by referring to FIGS. 1 and 2. FIG. 2 shows the state in which the headlamp is in its protruded position. The movement of the lamp cover from its closed position is indicated by the phantom lines.

When the headlamp 11 is in its retracted position as shown in FIG. 1, and the crank arm 43 is rotated in a counterclockwise direction, the driving rod 44 is pushed upward thereby rotating the upper lever 13 in a clockwise direction to elevate the headlamp 11 to its protruded position shown in FIG. 2 via the lamp bracket 12 of the lamp-operating linkage 18. During this process, the orientation of the headlamp is maintained constant.

Since the front lever 23 and the upper lever 13 are integrally formed, the cover-operating linkage 28 and the lamp-operating linkage 18 are connected. When the headlamp 11 is moved upward or downward, the motor 41 opens or closes the lamp cover 21.

When the lamp cover 21 is in the closed position shown in FIG. 1 and the headlamp 11 is moved upward, the cover 21 is moved into the position shown in FIG. 2 via the cover bracket 22 of the cover-operating linkage 28 that interlocks with the lamp-operating linkage 18. At this time, the lamp cover 21 starts to move from its closed position. At this time, the point P that is the instantaneous center of the cover bracket 22 and the lamp cover 21 is located above and behind the rear end 21a of the lamp cover 21. Therefore, the bracket 22 and the cover 21 rotate in a clockwise direction about the point P. Thus, when the lamp cover 21 begins to move from its closed position, the rear end 21a of the lamp cover 21 rotates about the point P in a slightly forward direction. The front end 21b begins to move substantially upwards about the point P. Since the lamp cover 21 does not move rearward, the rear end 21a of the cover 21 does not interfere with the engine hood 32 when a curved portion having a large radius of curvature is formed around the rear end 21a of the cover 21 and if a part of the rear end is located behind the illustrated position. The instantaneous center of the cover bracket 22 and the lamp cover 21 moves from moment to moment from the point P.

In this way, the lamp cover 21 interlocks with the headlamp 11. At the beginning of the movement, the rear end 21a of the lamp cover 21 shifts forward. Then, it draws a trajectory as shown in FIG. 2 and arrives at its open position without interfering with the front end of the engine hood 32.

When the headlamp 11 moves from its protruded position to its retracted position, the reverse operation is performed. That is, the crank arm 43 rotates clockwise from the state shown in FIG. 2 to lower the driving rod 44. Then, the upper lever 13 turns counterclockwise to move the headlamp 11 downward via the lamp bracket 12 of the lamp-driving linkage 18. Finally, the headlamp reaches its retracted position shown in FIG. 1. On the other hand the lamp cover 21 moves into the closed position shown in FIG. 1 via the cover bracket 22 of the cover-operating linkage 28 interlocking with the lamp-operating linkage 18. At this time, the lamp cover 21 arrives at its closed position after drawing the same trajectory as when the cover is opened as shown in FIG. 2.

Having described a specific embodiment of the invention, it is our intention that the invention not be limited by any of the details of description. For instance, the lamp cover may be directly mounted to the cover-operating linkage and not via the cover bracket. The lower lever of the lamp-operating linkage may be formed integrally with the front lever of the cover-operating linkage. In the above example, the motor 41 is a reversible motor. It can also be a motor rotating in one direction only. Furthermore, the invention is not limited to a headlamp which protrudes entirely from inside the vehicle when the lamp is lit. The headlamp may be entirely or partially placed inside the vehicle when the lamp is lit.

What is claimed is:

1. A retractable automobile headlamp system comprising:
    a headlamp retractably mounted to an automobile body such that said headlamp is movable between a retracted position inside the automobile body and an exposed position outside the body;
    a lamp cover moveably mountable to the automobile such that when the headlamp is in said retracted position, said lamp cover covers the headlamp;
    support means comprising a plurality of linkages extending between the automobile body, headlamp and cover for supporting said lamp cover such that the lamp cover is movable between an open position and a closed position, the support means being configured to rotate said lamp cover about an instantaneous center located above and behind a rear end of the lamp cover when the cover is advanced from said closed position to said open position; and
    driving means for driving said headlamp and said lamp cover via said support means such that said cover moves between said open position and said closed position.

2. A retractable automobile headlamp system according to claim 1, wherein said linkages comprise a pair of links by which a front end and the rear end of the lamp cover are respectively moveably mountable to the body of the automobile.

3. A retractable automobile headlamp system according to claim 2, wherein the points at which said links pivotally support said lamp cover are located below the points at which said links are pivotally supported by the body of the automobile.

4. A retractable automobile headlamp system according to claim 3, wherein said link which supports said front end of said lamp cover is longer than said link supporting said rear end of said lamp cover.

5. A retractable automobile headlamp system according to claim 4, wherein said link which supports said front end of said lamp cover is formed integrally as one member with a link which supports said headlamp.

6. A retractable automobile headlamp system comprising:
    a headlamp retractably mountable to an automobile body such that said headlamp is generally linearly movable between a retracted position inside the body of the automobile and an exposed position outside the body;
    a lamp cover moveably mountable to the automobile body such that when said headlamp is in its retracted position, said lamp cover covers the headlamp;
    lamp supporting links pivotally supporting said headlamp;
    a rear link pivotally coupled to said lamp cover the body of the automobile;
    a front link formed integrally with one of said lamp links, said front link pivotally supporting a front portion of said lamp cover and being pivotally supported by the body of the automobile; and
    wherein, when said lamp cover begins to move from a closed position to an opened position thereof, said lamp cover moves toward a front end of the automobile and rotates about an instantaneous center defined by the intersection of a rearward projection extending along a longitudinal axis of each said front and rear links, said instantaneous center being located above and behind said lamp cover and above the body.

7. A retractable automobile headlamp system comprising:
    a support means mounted inside a body of an automobile;
    a linkage means pivotally connected to said support means;
    a headlamp pivotally connected to said linkage means such that said linkage means effects movement of said headlamp from a retracted position inside said automobile body to an exposed position outside said body; and
    a lamp cover pivotally connected to said linkage means, said linkage means providing movement of said lamp cover from a closed position covering said headlamp to an open position along an arcuate path and about an instantaneous center situated above and behind a rear end of said lamp cover, said instantaneous center being removed from said automobile body when said lamp cover begins to move from said closed position to said open position.

8. A retractable automobile headlamp system according to claim 7, wherein said linkage means is operable to move a rear end of said lamp cover toward an automobile front end when said lamp cover starts to move from said closed position to said open position.

9. A retractable automobile headlamp system according to claim 7 further comprising a driving means connected to said linkage means for providing control of said movement of said headlamp and said lamp cover.

10. A retractable automobile headlamp system according to claim 9, wherein at least one of said linkage means comprises a plurality of linkages retractably mounting said lamp cover to said body of said automobile.

11. A retractable automobile headlamp system according to claim 10, wherein said linkages include:
    a first link having two ends, one end of said link rotatably supporting a front portion of said lamp cover; and
    a second link having two ends, one end of said second link rotatably supporting the rear portion of said lamp cover.

12. A retractable automobile headlamp system according to claim 4, wherein second ends of the first and second links are each pivotally connected to said support means such that a rearward projection extending along a longitudinal axis of each of said first and second links intersect at said lamp cover instantaneous center when said lamp cover is in said closed position, said instantaneous center being changeable in position in accordance with movement of said lamp cover.

13. A retractable automobile headlamp system according to claim 12, wherein said first link is longer than said second link.

14. A retractable automobile headlamp system according to claim 12, wherein said first link is formed integrally with a third link, said third link being operable to pivotally support said headlamp as said headlamp moves between said retracted position and said exposed position.

15. A retractable automobile headlamp system according to claim 14, wherein said linkage means further comprises:

at least one lamp supporting means coupled to said headlamp to provide for headlamp displacement between said retracted position and said exposed position;

a lamp cover supporting means provided with at least two legs of unequal length and interlocking with said lamp supporting means through said first and third links, and interlocking with said support means through said first and second links.

16. A retractable automobile headlamp system according to claim 15, wherein said legs of said lamp cover supporting means are partially formed integrally.

17. A retractable automobile headlamp system according to claim 15, wherein a first of said legs is secured to said lamp cover near a front end of said cover and the second of said leg is secured to said lamp cover near said rear end, said first leg being shorter than said second leg.

18. A retractable automobile headlamp system according to claim 17, wherein the first link pivotally supports the lamp cover and is pivotally coupleable to a point of the body of the automobile; and said second link pivotally supports said lamp cover and is pivotally coupleable to the body of the automobile at a point lower than said point to which the said first link is pivotally coupleable to the body of the automobile.

19. A retractable automobile headlamp system according to claim 14, further comprising:

a lamp supporting means coupled to said headlamp and to said linkage means; and a lamp cover support means having at least a first and a second leg unequal in length and interlocking with said linkage means.

20. A retractable automobile headlamp system according to claim 19, wherein said two legs of said lamp cover supporting means are at least partially formed integrally.

21. A retractable automobile headlamp system according to claim 20, wherein said first leg is secured to said lamp cover near a front end of said lamp cover and said second leg is secured to said rear end, said first leg being shorter in length than said second leg.

22. A retractable automobile headlamp system according to claim 21, wherein said first link is pivotally coupled at a first fulcrum point to said support means in said automobile body; and said second link is pivotally coupled to a second fulcrum to said support means, said second fulcrum being lower than said first fulcrum.

23. An automobile headlamp system according to claim 7, wherein said linkage means comprises:

at least one lamp support link pivotally coupled to said headlamp such that said headlamp moves between said retracted position and said exposed position, and at least two lamp cover links unequal in length and interlocking with said lamp support links, said lamp cover links supporting said lamp cover such that the cover moves between said closed position and said open position.

24. An automobile headlamp system according to claim 23, wherein said lamp support link and at least one of said lamp cover links are partially formed integrally.

25. A retractable automobile headlamp system according to claim 24, wherein a first of said lamp cover links pivotally supports a front end of said lamp cover and a second of said lamp cover links pivotally supports said rear end of said lamp, said second link being shorter than said first link.

26. A retractable automobile headlamp system according to claim 25, wherein said first link pivotally supports said lamp cover and is pivotally coupleable to a point of said automobile body; and the second link pivotally supports said lamp cover and is pivotally coupleable to the automobile body at a point lower than said point to which the said first link is pivotally coupleable to said automobile body.

27. A retractable automobile headlamp system according to claim 7, comprising:

a lamp supporting means coupled to said headlamp and to said linkage means; and a lamp cover support means having at least two legs unequal in length and interlocking with said linkage means.

28. A retractable automobile headlamp system according to claim 27, wherein said two legs of said lamp cover supporting means are partially formed integrally.

29. A retractable automobile headlamp system according to claim 28, wherein a first leg of said two legs of said lamp cover supporting means is secured to said lamp cover near a front end and a second leg of said two legs is secured to said lamp cover near said rear end, said first leg being shorter than said second leg.

30. A retractable automobile headlamp system according to claim 29, wherein a first link pivotally supports said front end of said lamp cover and is pivotally coupled at a first fulcrum point to said support means; and a second link pivotally supports said rear end of said lamp cover and is pivotally coupled at a second fulcrum to said support means, said second fulcrum being positioned lower relative to said first fulcrum.

31. A retractable automobile headlamp system according to claim 7, further comprising a driving means which includes an electric motor and a connecting means operably connecting said motor with said linkage means for driving and controlling the movement of said headlamp and said lamp cover.

32. A retractable automobile headlamp system comprising:

a support bracket means having an upper flange and a lower flange mounted inside a body of an automobile;

a first link means pivotally connected at one end to a first fulcrum on said upper flange;

a second link pivotally connected at one end to a second fulcrum on said upper flange;

a third link pivotally connected at one end to said first fulcrum on said upper flange;

a fourth link pivotally connected at one end to a third lower fulcrum on said lower flange;

a headlamp retainer having an upper end pivotally connected to the other end of said third link, and a lower end pivotally connected to said other end of said fourth link such that said third and fourth link allow movement of said headlamp retainer from a retracted position inside said body of said automobile to an exposed position outside said body; and a lamp cover having a front end and a rear end, said front end being pivotally coupled to sais first link and said rear end being pivotally coupled to said second link, said first and second links allowing movement of said lamp cover from a closed position covering said headlamp to an open position;
said first fulcrum and said third fulcrum defining a generally vertically-oriented straight line extending through both, and said second fulcrum being adjacent to said first upper fulcrum.

33. A retractable automobile headlamp system according to claim 32, wherein said first and third links are formed together integrally.

34. A retractable automobile headlamp system according to claim 32, wherein as said lamp cover begins to move from a closed position to an open position, said lamp cover rotates about an instantaneous center which is defined by an intersection of imaginary lines which extend through a central axis of each of said first and said second links.

35. A retractable automobile headlamp system according to claim 32, further including a driving means having an electric motor and crank means pivotally connected to said third link for driving and controlling the movement of said headlamp and said lamp cover.

36. A retractable automobile headlamp system according to claim 32, wherein the movement of said lamp cover is synchronized to the movement of said headlamp.

* * * * *

UNITED STATES PATENT AND TRADEMARK OFFICE
CERTIFICATE OF CORRECTION

PATENT NO. : 5,050,049
DATED : Sep. 17, 1991
INVENTOR(S) : Masanori SHICHIJOH et al.

It is certified that error appears in the above-identified patent and that said Letters Patent is hereby corrected as shown below:

On the cover page, the assignee data should read as follows:

Assignees: Asmo Co., Ltd. of Shizuoka-ken, Japan;
Mitsubishi Jidosha Kogya Kabushiki
Kaisha of Tokyo, Japan Signed and Sealed this Seventeenth Day of August, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,050,049
DATED : September 17, 1991
INVENTOR(S) : Masanori SHICHIJOH et al.

It is certified that error appears in the above-identified patent and that said Letters Patent is hereby corrected as shown below:

In claim 12, at column 6, line 49, "4" should read -- 11 --.

Signed and Sealed this

Second Day of August, 1994

*Attest:*

BRUCE LEHMAN

*Attesting Officer*         *Commissioner of Patents and Trademarks*